United States Patent [19]

Konnai et al.

[11] 3,926,612

[45] *Dec. 16, 1975

[54] HERBICIDAL COMPOSITION CONTAINING S-(2-CHLOROBENZYL)-N,N-DI-ISOPROPYLTHIOCARBAMATE

[75] Inventors: Makoto Konnai, Shizuoka; Hiroshi Kamata; Masaru Kado, both of Shimizu, all of Japan

[73] Assignee: Kumiai Chemical Industry Co., Ltd., Tokyo, Japan

[ * ] Notice: The portion of the term of this patent subsequent to June 1, 1988, has been disclaimed.

[22] Filed: Apr. 22, 1974

[21] Appl. No.: 462,933

Related U.S. Application Data

[63] Continuation-in-part of Ser. No. 70,502, Sept. 8, 1970, Pat. No. 3,822,124, Continuation of Ser. No. 868,900, Oct. 23, 1969, abandoned, which is a continuation-in-part of Ser. No. 651,148, July 5, 1967, Pat. No. 3,582,314.

[52] U.S. Cl. ................................... 71/100
[51] Int. Cl.$^2$ ............................. A01N 9/12
[58] Field of Search ........................... 71/100

[56] References Cited
UNITED STATES PATENTS

| | | | |
|---|---|---|---|
| 2,992,091 | 7/1961 | Harman et al. | 71/100 |
| 3,582,314 | 1/1971 | Konnai et al. | 71/100 |
| 3,822,124 | 7/1974 | Konnai et al. | 71/100 |

*Primary Examiner*—Glennon H. Hollrah
*Attorney, Agent, or Firm*—Stevens, Davis, Miller & Mosher

[57] ABSTRACT

A herbicidal composition for selectively killing undesirable weeds in paddy rice fields and lawn comprising S-(2-chlorobenzyl)-N,N-di-isopropylthiocarbamate as an active ingredient.

1 Claim, No Drawings

HERBICIDAL COMPOSITION CONTAINING S-(2-CHLOROBENZYL)-N,N-DI-ISOPROPYLTHIOCARBAMATE

This application is a continuation-in-part of our copending application Ser. No. 70,502 filed Sept. 8, 1970 now U.S. Pat. No. 3,822,124, which is a streamlined continuation application Ser. No. 868,900 filed Oct. 23, 1969 now abandoned which is a continuation-in-part of application Ser. No. 651,148 filed July 5, 1967, now U.S. Pat. No. 3,582,314 issued June 1, 1971.

The present invention relates to herbicidal compositions containing S-(2-chlorobenzyl)-N,N-di-isopropylthiocarbamate as an active ingredient and a method for controlling or killing undesirable weeds in lawn by using the above described S-(2-chlorobenzyl)-N,N-di-isopropylthiocarbamate as the active ingredient.

S-(2-chlorobenzyl)-N,N-di-isopropylthiocarbamate according to the present invention is active as herbicidal composition and has a high activity for controlling germination of various weeds in agricultural field or lawn and particularly, said compound can prevent Wiregrass (*Eleocharis Acicularis* ROEM. et SCHULTO and Barnyard grass (*Echinochloa Crus-galli* P. BEAUV), which are main noxious weeds in paddy, or Mana-grass (*Digitaria adscendens* HENR.), Annula Poa (*Poa annua* L.), Smartweed (*Polygonum longisetum* De BRUYN), Asiatic dayflower (*Commelina communis* L.) and Wild amaranth (*Amaranthus ascendens* LOISEL), which are main noxious weeds in lawn.

Herbicidal composition applied previously to paddy or lawn have involved PCP, NIP (active ingredient: 4-nitro-2',4'-dichlorodiphenyl ether), Prometryne (active ingredient: 2-methylthio-4,6-bis(isopropylamino)-S-triazine), TCTP (active ingredient: 2,3,5,6-tetrachloroterephthalic acid dimethyl ester), Simazin (active ingredient: 2-chloro-4,6-bis-(ethylamino)-S-triazine) and other numerous compositions, but almost of them have been used for controlling germination of weeds after paddy rice plant is planted. These previous herbicidal compositions are effective for therophyte weeds generated at a relatively early stage after planted the rice plant, but have extremely poor activity or substantially no activity for Wiregrass of perennial weed. Recently, this Wiregrass has become problem as preferential weed in paddy, because any herbicidal composition, which has no phytotoxicity on paddy rice plant or turf, and can prevent exactly Wiregrass, has never been discovered.

The reason why Wiregrass has been unusually grown in paddy is based on the fact that in general, the previous herbicidal compositions are spread 3 to 7 days after the rice plant is planted, while generation of Wiregrass is about 2 weeks after planted, that is, Wiregrass is generated when the activity of the herbicidal compositions are decreased and further Wiregrass is perennial, so that it has high resistance against the herbicidal composition.

The most active composition for preventing Wiregrass has been DBN (active ingredient: 2,6-dichlorobenzonitrile), but this composition is highly phytotoxic against paddy rice plant, so that it has problem in practice.

However, the S-(2-chlorobenzyl-N,N-di-isopropylthiocarbamate according to the present invention is excellent in the activity for preventing Wiregrass and particularly, when it is used in an original stage of growth of Wiregrass, Wiregrass is completely prevented in an amount of less than 500 g/10 ares. Particularly, when surface layer of soil or water field paddy is applied with 250 g/10 ares before germination of the weed, the growth of the weeds, such as, Wiregrass, Barnyard grass and Crabgrass, etc., can be prevented, and paddy rice plant planted in a depth of more than 2 cm is not damaged. When 800 to 1,000 g/10 ares are used, the growth is slightly suppressed temporarily but hereafter is not affected and this compound has substantially no damage.

An explanation will be given with respect to the application of the S-(2-chlorobenzyl)-N,N-di-isopropylthiocarbamate according to the present invention to lawn.

Turfs, such as Japanese lawngrass, (*Zoyia Japonica*), Manilagrass (*Zoyia tenuifolia*), Bermudagrass (*Cynodon dactylon*) and the like, are widely used in the garden, park, golf links and the like, and it is an important problem to prevent undesirable weeds in the turfs. However, when a herbicidal composition is applied to lawn, it is always obliged to spread the herbicidal composition over the area, wherein the stem and leaf of turf grow thick, owing to the characteristics of lawn. Therefore, as herbicidal compositions, it is essential to show no adverse effect on turf even when the active ingredient is directly contacted with the stem and leaf of the turf. In other words, herbicidal compositions having a high selectivity between weed and turf are demanded. Accordingly, although a large number of herbicidal compositions have hitherto been applied to upland field, herbicidal compositions which can be applied to lawn are very scarce and only practical products were the above described TCTP and Simazin.

The inventors have made various investigations for the utilization of benzylthiol-carbamates as herbicide and some of them have already been used widely and practically as a herbicidal composition both in paddy field and upland field. The inventors further have found during the course of the above investigations that the S-(2-chlorobenzyl)-N,N-di-isopropylthiocarbamate according to the present invention has no phytotoxicity on turfs, such as Japanese lawngrass, Manilagrass, Bermudagrass and the like, and has a high herbicidal activity on weeds found in the turfs. That is, when this compound is used in an amount of 50–2,000 g/10 ares of lawn before germination or in an early stage of growth of therophytic weeds, such as Managrass, Annual Poa and the like, in the lawn, the germination and growth of these weeds can be completely inhibited and finally the weeds are withered. TCTP and Simazine have hitherto been used as the conventional herbicidal composition for lawn, but they often cause discoloration of turf or kill the top portion of leaf thereof, and therefore, TCTP and Shimazin are not complete therophytic weed killers in lawn. The compound of the present invention has no phytotoxicity on turfs and can selectively prevent undesirable weeds. Moreover, it was observed during the course of these studies, that many thiocarbamates have unpleasant odor and are unfitting to the actual wide space application, while the compound of the present invention has only very weak odor and the odor is practically insignificant.

Then, a method for producing S-(2-chlorobenzyl)-N,N-di-isopropylthiocarbamate according to the present invention will be explained in the following.

2-chlorobenzyl mercaptan is dissolved in an inert solvent such as toluene or benzene and to the resulting solution is added dropwise a solution of phosgene in an inert solvent and the resulting mixture is stirred while cooling and added with a hydrochloride acceptor dropwise. Then, the resulting mixture is added dropwise with diisopropylamine and the mixture is reacted. In order to remove hydrochloride of the hydrochloride acceptor (amines) after completion of the reaction, the reaction product is washed with water, dried and concentrated. Furthermore, the resulting liquid is purified by recrystallization (white leaflet, m.p. 54°–55°C).

S-(2-chlorobenzyl)-N,N-di-isopropylthiocarbamate according to the present invention is mixed with diluents involving carriers and surfactants to prepare dust, emulsifiable concentrate and wettable powder, which are used directly or after diluted with water as herbicidal compositions.

Furthermore, said carbamate can be prepared into granular composition. Namely, said thiocarbamate is increased in an amount with bentonite, clay, talc, lime stone, etc. and added with a binder, such as, PVA (polyvinyl alcohol) and the resulting mixture is kneaded with water and subjected to an extrusion type of granule forming machine and the formed granules are dried. Alternatively, said thiocarbamate is dissolved in a proper solvent and the solution is homogeneously absorbed into granular diatomaceous earth, vermiculite, etc. As the other means, by said thiocarbamate is coated surface of granular lime stone uniformly. The granules thus obtained are dispersed uniformly by hand, granule spreader, helicopter, etc.

The term "carrier" used herein means carrying agents used for transferring said thiocarbamate to desired areas, which may be solid or liquid. For example, as the solid carrier, mention may be made of various clays, talc, kaoline, diatomaceous earth, calcium carbonate, white carbon, saw dust, etc. As the liquid carrier, use may be made of a solvent for the active ingredient or a liquid which is non-solvent, but can disperse or dissolve the active ingredient through an adjuvant, for example, water, benzene, kerosene, alcohol, acetone, methylnaphthalene, xylene, etc.

The term "surfactants" used herein means nonionic surfactants, such as, polyoxyethylenealkylaryl ether, polyoxyethylenesorbitane monolaurate, etc.; cationic surfactants, such as, alkyldimethylbenzyl ammonium chloride, alkylpyridinium halide, etc.; anionic surfactants, such as, alkylbenzene sulfonates, fatty alcohol sulfates, etc.; amphoteric surfactants, such as, lauryl amine derivatives, betaine derivatives, dodecyl diaminoethyl glycine, etc.

The invention will be further explained in detail with reference to the following preparation examples:

EXAMPLE 1

Wettable powder

Twenty five parts by weight of S-(2-chlorobenzyl)-N,N-di-isopropylthiocarbamate, 10 parts by weight of white carbon, 60 parts by weight of diatomaceous earth and 5 parts by weight of wetting agent of a mixture of polyoxyethylenealkyl phenol ether, polyoxyethylenephenylphenol ether and polyoxyethylene carbonate were mixed and milled and the resulting powder was suspended in water, which was sprayed.

EXAMPLE 2

Granule

Five parts by weight of S-(2-chlorobenzyl)-N,N-di-isopropylthiocarbamate were sprayed on and adsorbed in 95 parts by weight of granular diatomaceous earth, which was being stirred and had 10 to 100 meshes.

EXAMPLE 3

Emulsifiable concentrate

Fifty parts by weight of S-(2-chlorobenzyl)-N,N-di-isopropylthiocarbamate, 30 parts by weight of xylene and 20 parts by weight of an emulsifier of a mixture of polyoxyethylenealkylphenol ether, polyoxyethylenephenylphenol ether and polyoxyethylene carbonate were mixed and dissolved. The resulting solution was diluted with water and then sprayed.

EXAMPLE 4

Granule

Five parts by weight of S-(2-chlorobenzyl)-N,N-di-isopropylthiocarbamate, 15 parts by weight of PCP sodium salt, 50 parts by weight of bentonite, 27 parts by weight of clay, 1 part by weight of sodium alkylarylsulfonate and 2 parts by weight of sodium ligninsulfonate were mixed and milled and then added with a suitable amount of water and kneaded and the kneaded mixture was subjected to an extrusion type of granule forming machine (open having 1 mm diameter) to obtain granules, which were dried.

In order to show the activity of the herbicidal compositions of the present invention, Experimental Examples are described as follows:

EXPERIMENTAL EXAMPLE 1

Test for controlling weeds in paddy rice field and for phytotoxicity on paddy rice plant:
Test method A surface layer of paddy soil containing seeds of the weed was fed in a Wagner pot of 1/5,000 are and stirred thoroughly therein. Then two groups of 2 to 3 leaf-stage paddy rice plant (species: KINMAZE), each of which being composed of two paddy rice plants, were transplanted in the pot, on the next day a given amount of germinated Barnyardgrass seeds (50 seeds per pot) was sowed thereon, and the pot was filled with water to a depth of 3 cm, and three days later a test solution obtained by diluting wettable powder of test compound shown in the following Table 1 with 10 cc of water, was dropped on the pot at a dose shown in the Table 1 by means of a pipette. Twenty days after the treatment, the herbicidal activity and the phytotoxicity on paddy rice plant were determined.

Table 1
| Active ingredient | Dose (g/10a) | Barn-yard-grass | Wire grass | Broad-leaf weeds | Phyto-toxicity on paddy rice plant |
|---|---|---|---|---|---|
| 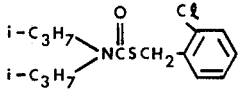 (Present invention) | 100 | 5 | 4 | 3 | — |
|  | 200 | 5 | 4.5 | 3 | — |
|  | 400 | 5 | 4.5 | 4.5 | — |
| 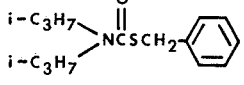 (Comparative compound) | 100 | 4.5 | 3 | 0 | + |
|  | 200 | 5 | 4 | 0 | + |
|  | 400 | 5 | 4.5 | 2 | +~++ |
| 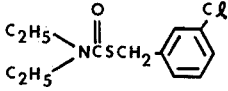 (Comparative compound) | 100 | 5 | 4.5 | 3 | + |
|  | 200 | 5 | 5 | 4.5 | ++ |
|  | 400 | 5 | 5 | 5 | +++ |
| 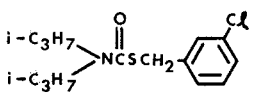 (Comparative compound) | 100 | 0 | 0 | 0 | — |
|  | 200 | 2 | 0 | 2 | — |
|  | 400 | 3 | 3 | 2 | ± |
| 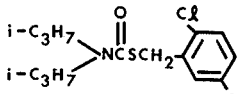 (Comparative compound) | 100 | 0 | 0 | 0 | — |
|  | 200 | 3 | 2 | 1 | — |
|  | 400 | 4 | 4 | 3 | + |
| 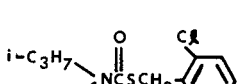 (Comparative compound) | 100 | 0 | 0 | 0 | — |
|  | 200 | 0 | 0 | 0 | — |
|  | 400 | 1 | 2 | 2 | + |
| 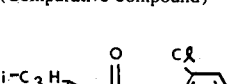 (Comparative compound) | 100 | 0 | 0 | 0 | — |
|  | 200 | 0 | 0 | 0 | — |
|  | 400 | 0 | 0 | 0 | — |
| 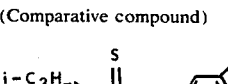 (U.S. Patent 2,992,091) | 100 | 0 | 0 | 0 | — |
|  | 200 | 0 | 0 | 1 | — |
|  | 400 | 1 | 0 | 2 | — |
| 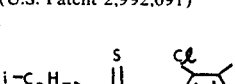 (U.S. Patent 2,992,091) | 100 | 0 | 0 | 0 | — |
|  | 200 | 0 | 0 | 0 | — |
|  | 400 | 1 | 0 | 1 | — |
| 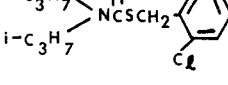 (U.S. Patent 2,992,091) | 100 | 0 | 0 | 0 | — |
|  | 200 | 0 | 0 | 1 | — |
|  | 400 | 1 | 0 | 2 | — |

Table 1-continued
| Active ingredient | Dose (g/10a) | Barn-yard-grass | Wire grass | Broad-leaf weeds | Phyto-toxicity on paddy rice plant |
|---|---|---|---|---|---|
| 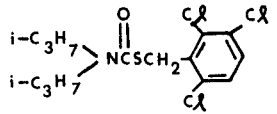 | 100 | 0 | 0 | 0 | — |
|  | 200 | 0 | 0 | 0 | — |
| (Comparative compound) | 400 | 0 | 0 | 0 | — |
| 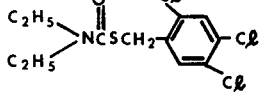 | 100 | 0 | 0 | 0 | — |
|  | 200 | 2 | 0 | 0 | — |
| (Comparative compound) | 400 | 2 | 0 | 0 | — |
| 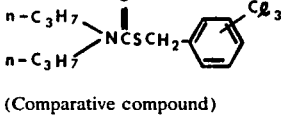 | 100 | 0 | 0 | 2 | — |
|  | 200 | 0 | 1 | 4 | — |
| (Comparative compound) | 400 | 0 | 3 | 5 | — |
|  | 100 | 0 | 0 | 0 | — |
|  | 200 | 0 | 0 | 0 | — |
| (Comparative compound) | 400 | 0 | 0 | 0 | — |
| 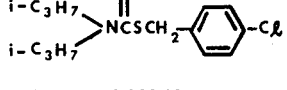 | 100 | 0 | 0 | 0 | — |
|  | 200 | 0 | 0 | 1 | + |
| (U.S. Patent 2,992,091) | 400 | 1 | 2 | 3 | ++ |
| 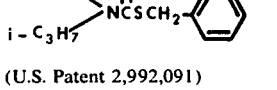 | 100 | 0 | 0 | 0 | — |
|  | 200 | 0 | 0 | 1 | + |
| (U.S. Patent 2,992,091) | 400 | 1 | 1 | 2 | ++ |
| 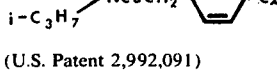 | 100 | 0 | 0 | 0 | — |
|  | 200 | 0 | 0 | 0 | — |
| (U.S. Patent 2,992,091) | 400 | 1 | 1 | 2 | + |
| 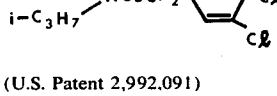 | 100 | 0 | 0 | 0 | — |
|  | 200 | 0 | 0 | 0 | — |
| (U.S. Patent 2,992,091) | 400 | 0 | 0 | 0 | — |
| 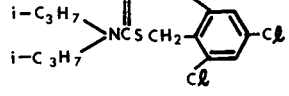 | 100 | 0 | 0 | 0 | — |
|  | 200 | 0 | 0 | 0 | — |
| (U.S. Patent 2,992,091) | 400 | 0 | 0 | 0 | — |
| 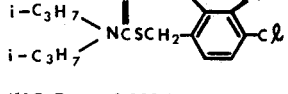 | 100 | 0 | 0 | 0 | — |
|  | 200 | 0 | 0 | 0 | — |
| (U.S. Patent 2,992,091) | 400 | 0 | 0 | 0 | — |

Table 1-continued

| Active ingredient | Dose (g/10a) | Barn-yard-grass | Wire grass | Broad-leaf weeds | Phyto-toxicity on paddy rice plant |
|---|---|---|---|---|---|
| Cl-⟨⟩-O-⟨⟩-NO₂ (with Cl) | 100 | 5 | 3 | 5 | +~++ |
|  | 200 | 5 | 4 | 5 | +++ |
| (Comparative compound, NIP) | 400 | 5 | 5 | 5 | +++ |
| Cl₅-C₆-ONa | 100 | 4 | 2 | 3.5 | — |
|  | 200 | 5 | 3 | 4.5 | — |
| (Comparative compound, PCP-Na) | 400 | 5 | 3.5 | 5 | + |

Note:
0—100% growth (the same effect as in non-treated area)
5—no growth (complete withering)
— —no damage
+++—maximum damage (complete withering)

EXPERIMENTAL EXAMPLE 2

Weed control activity and rice toxicity depending upon kinds of soil:

Test method:

Sandy soil (clay content: about 10%), loam (clay content: about 30%), and clay loam (clay content: about 70%) were fed in porcelain pots having a diameter of 15 cm, respectively, and then each pot was flooded with water to a depth of 3 cm. Thereafter, 10 rice plants per pot of 2-leaf stage paddy rice plant (variety: KINMAZE) were planted in the pots, and 24 hours later 50 seeds per pot of each of Barnyardgrass (*Echinochloa crus-galli*) and Konagi (*Monochoria vaginalis*) were sowed thereon.

Three days later, a test solution obtained by diluting a given amount of a 25% wettable powder of active ingredient shown in the following Table 2 with 10 ml of water was uniformly dropped on the water surface in the pot. Twenty days after the treatment, the inhibition rate against Barnyardgrass and Konagi and phytotoxicity on paddy rice plant were determined.

Moreover, the 25% wettable powder was prepared as follows:

Twenty five parts by weight of thiocarbamate, 10 parts by weight of white carbon, 60 parts by weight of diatomaceous earth and 5 parts by weight of wetting agent of a mixture of polyoxyethylenealkyl phenol ether, polyoxyethylenephenylphenol ether and polyoxyethylene carbonate were mixed and milled.

Table 2

| Active ingredient | Dose (g/10a) | Sandy Soil Inhibition rate Barnyardgrass | Sandy Soil Inhibition rate Konagi | Sandy Soil Phytotoxicity Paddy rice plant | Loam Inhibition rate Barnyardgrass | Loam Inhibition rate Konagi | Loam Phytotoxicity Paddy rice plant | Clay Loam Inhibition rate Barnyardgrass | Clay Loam Inhibition rate Konagi | Clay Loam Phytotoxicity Paddy rice plant |
|---|---|---|---|---|---|---|---|---|---|---|
| Present Invention (i-C₃H₇)₂NC(O)SCH₂-C₆H₄-Cl | 400 | 5 | 5 | — | 5 | 5 | — | 5 | 5 | — |
|  | 200 | 5 | 4 | — | 5 | 4 | — | 5 | 4 | — |
|  | 100 | 5 | 3.5 | — | 5 | 3 | — | 5 | 3 | — |
| U.S. Patent 2,992,091 (i-C₃H₇)₂NC(S)SCH₂-C₆H₄-Cl₂ | 400 | 4 | 4 | ++ | 3.5 | 3.5 | + | 3 | 3.5 | — |
|  | 200 | 3 | 3 | + | 2.5 | 3 | — | 2 | 2.5 | — |
|  | 100 | 2 | 2 | — | 1 | 2 | — | 1 | 1 | — |
| (i-C₃H₇)₂NC(S)SCH₂-C₆H₄-Cl | 400 | 4 | 4.5 | ++ | 3.5 | 3.5 | + | 3 | 3.5 | — |
|  | 200 | 3 | 3.5 | + | 2 | 2.5 | — | 2 | 2.5 | — |
|  | 100 | 2 | 2 | — | 1 | 2 | — | 1 | 1.5 | — |

Table 2-continued

| Active ingredient | Dose (g/10a) | Sandy Soil | | | Loam | | | Clay Loam | | |
|---|---|---|---|---|---|---|---|---|---|---|
| | | Inhibition rate | | Phytotoxicity | Inhibition rate | | Phytotoxicity | Inhibition rate | | Phytotoxicity |
| | | Barnyardgrass | Konagi | Paddy rice plant | Barnyardgrass | Konagi | Paddy rice plant | Barnyardgrass | Konagi | Paddy rice plant |
| (i-C$_3$H$_7$)$_2$NC(=S)SCH$_2$-C$_6$H$_4$-Cl (para) | 400 | 4.5 | 4.5 | ++ | 3.5 | 4 | + | 3 | 3.5 | − |
| | 200 | 3.5 | 4 | + | 2 | 3 | ± | 2 | 2.5 | − |
| | 100 | 2 | 3 | − | 1 | 2 | − | 1 | 1 | − |
| (i-C$_3$H$_7$)$_2$NC(=S)SCH$_2$-C$_6$H$_4$-Cl (meta) | 400 | 4 | 4 | ++ | 3 | 3.5 | + | 2.5 | 3 | − |
| | 200 | 3 | 3 | + | 2 | 3 | − | 1.5 | 2 | − |
| | 100 | 2 | 2 | − | 1 | 2 | − | 0 | 1 | − |
| (i-C$_3$H$_7$)$_2$NC(=S)SCH$_2$-C$_6$H$_3$-Cl$_3$ | 400 | 3.5 | 3 | + | 2.5 | 2 | ± | 2 | 2 | − |
| | 200 | 3 | 2 | ± | 1.5 | 1 | − | 1 | 1 | − |
| | 100 | 1.5 | 1 | − | 0 | 0 | − | 0 | 0 | − |
| (CH$_3$)$_2$NC(=S)SCH$_2$-C$_6$H$_5$ | 400 | 4.5 | 4.5 | ++ | 4.5 | 4 | + | 4 | 4 | − |
| | 200 | 4 | 3.5 | + | 3.5 | 3 | − | 3 | 3 | − |
| | 100 | 3 | 2.5 | − | 2 | 2 | − | 2 | 2 | − |
| (C$_2$H$_5$)$_2$NC(=O)SCH$_2$-C$_6$H$_4$-Cl$_3$ | 400 | 3.5 | 2.5 | + | 3 | 2 | ± | 3 | 2 | − |
| | 200 | 2.5 | 1.5 | ± | 2 | 1 | − | 2 | 1 | − |
| | 100 | 1.5 | 1 | − | 1 | 0 | − | 1 | 0 | − |
| (i-C$_4$H$_9$)$_2$NC(=O)SCH$_2$-C$_6$H$_4$-Cl$_3$ | 400 | 3 | 3 | ± | 2.5 | 2.5 | − | 2 | 2 | − |
| | 200 | 2 | 2 | − | 1.5 | 1 | − | 1 | 1 | − |
| | 100 | 1 | 1 | − | 0 | 0 | − | 0 | 0 | − |

British Patent No. 995,497

| Active ingredient | Dose (g/10a) | Sandy Soil | | | Loam | | | Clay Loam | | |
|---|---|---|---|---|---|---|---|---|---|---|
| (i-C$_3$H$_7$)$_2$NC(=O)SCH$_2$-C$_6$H$_4$-Cl$_2$ | 400 | 5 | 5 | +++ | 5 | 4.5 | ++ | 4.5 | 4.5 | + |
| | 200 | 4.5 | 4 | ++ | 4 | 4 | + | 3.5 | 3.5 | − |
| | 100 | 3.5 | 3 | + | 3 | 3 | − | 2.5 | 2.5 | − |
| (i-C$_3$H$_7$)$_2$NC(=O)SCH$_2$-C$_6$H$_4$-Cl | 400 | 5 | 4.5 | ++~+++ | 4.5 | 4 | ++ | 4.5 | 4 | + |
| | 200 | 4 | 3.5 | +~++ | 4 | 3.5 | + | 3.5 | 3 | − |
| | 100 | 3 | 2.5 | + | 2.5 | 2 | − | 2.5 | 2 | − |
| (i-C$_3$H$_7$)$_2$NC(=O)SCH$_2$-C$_6$H$_4$-Cl | 400 | 5 | 4.5 | ++~+++ | 5 | 4 | ++ | 4.5 | 3.5 | + |
| | 200 | 4 | 3.5 | +~++ | 4 | 3 | + | 3.5 | 2.5 | − |
| | 100 | 3 | 2 | ± | 2.5 | 2 | − | 2 | 1.5 | − |
| (i-C$_3$H$_7$)$_2$NC(=O)SCH-C$_6$H$_3$-Cl$_2$ | 400 | 2.5 | 2.5 | ± | 2.5 | 2.5 | − | 2 | 2 | − |
| | 200 | 1.5 | 1.5 | − | 1 | 1 | − | 1 | 1 | − |
| | 100 | 0 | 1 | − | 0 | 0 | − | 0 | 0 | − |
| (i-C$_3$H$_7$)$_2$NC(=O)SCH$_2$-C$_6$H$_5$ | 400 | 5 | 4.5 | +++ | 5 | 4.5 | ++ | 5 | 4 | +~++ |
| | 200 | 5 | 3.5 | ++ | 4.5 | 3 | + | 4 | 3 | + |
| | 100 | 4 | 2 | + | 4 | 2 | ± | 3.5 | 2 | − |
| (n-C$_4$H$_9$)$_2$NC(=O)SCH$_2$-C$_6$H$_5$ | 400 | 5 | 4 | ++ | 4.5 | 3.5 | +~++ | 4.5 | 3.5 | + |
| | 200 | 4 | 3 | + | 3.5 | 2.5 | ± | 3 | 2 | − |
| | 100 | 3 | 2 | − | 2 | 1 | − | 2 | 1 | − |

Table 2-continued

| Active ingredient | Dose (g/10a) | Sandy Soil | | | Loam | | | Clay Loam | | |
|---|---|---|---|---|---|---|---|---|---|---|
| | | Inhibition rate | | Phyto-toxicity | Inhibition rate | | Phyto-toxicity | Inhibition rate | | Phyto-toxicity |
| | | Barn-yard-grass | Konagi | Paddy rice plant | Barn-yard-grass | Konagi | Paddy rice plant | Barn-yard-grass | Konagi | Paddy rice plant |
| Blank sample* | — | 0 | 0 | — | 0 | 0 | — | 0 | 0 | — |
| Untreated | — | 0 | 0 | — | 0 | 0 | — | 0 | 0 | — |

Note
*In the above described preparation of the wettable powder, the active ingredient was removed, that is, this composition consists of white carbon diatomaceous earth and wetting agent.
Inhibition rate:
5—complete control
0—no effect
Phytotoxicity:
+++—severe damage
——no damage

EXPERIMENTAL EXAMPLE 3

Weed control activity at 2-leaf stage Barnyardgrass and toxicity on seedling of rice plant:
Test method A paddy soil containing uniformly rhizomes of Slenderspikerush (*Eleocharis ascicularis*) was fed in a Wagner pot of 1/5,000 a, and thereafter 5 tubes per pot of Mizugayaturi (*Cyperus serotinus*) were buried therein and 50 seeds per pot of each of Barnyardgrass (*Echinochloa crus-galli*) and Konagi (*Monochoria vaginalis*) were sowed thereon. Then the pot was flooded with water to a depth of 3 cm. When the Barnyardgrass grew to 2-leaf stage, 10 rice plants per pot of 1-leaf stage paddy rice plant (variety: KINMAZE) were planted in the pot.

Two days after the plantation, a test solution obtained by diluting a given amount of 25% wettable powder of active ingredient shown in the following Table 3 with 19 ml of water was uniformly dropped on the water surface in the pot. Twenty days after the treatment, the inhibition rate against weeds and phytotoxicity on paddy rice plant were determined.

Moreover, the 25% wettable powder was prepared as follows:

Twenty five parts by weight of thiocarbamate, 10 parts by weight of white carbon, 60 parts by weight of diatomaceous earth and 5 parts by weight of wetting agent of a mixture of polyoxyethylenealkyl phenol ether, polyoxyethylenephenylphenol ether and polyoxyethylene carbonate were mixed and milled.

Table 3

| Active ingredient | Dose (g/10a) | Inhibition rate | | | | Phytotoxicity on paddy rice plant |
|---|---|---|---|---|---|---|
| | | Barn-yard-grass | Konagi | Slender-spikerush | Mizuga-yaturi | |
| Present Invention | | | | | | |
| No. 1 | 500 | 5 | 5 | 4.5 | 5 | — |
| | 250 | 5 | 4 | 4 | 4 | — |
| | 125 | 4.5 | 3 | 3 | 3 | — |
| U.S.P. 2,992,091 | | | | | | |
| No. 2 | 500 | 2 | 2.5 | 3 | 3 | + |
| | 250 | 1 | 1.5 | 2 | 2 | — |
| | 125 | 0 | 0 | 1 | 1 | — |
| No. 3 | 500 | 2 | 2 | 3 | 3 | + |
| | 250 | 1 | 1 | 2 | 2 | — |
| | 125 | 0 | 0 | 1 | 0 | — |
| No. 4 | 500 | 2.5 | 2.5 | 3 | 3 | +~++ |
| | 250 | 1 | 1.5 | 2 | 2 | ± |
| | 125 | 0 | 0 | 1 | 1 | — |
| No. 5 | 500 | 2 | 2 | 3 | 2.5 | ++ |
| | 250 | 1 | 1 | 2 | 1.5 | + |
| | 125 | 0 | 0 | 1 | 0.5 | — |
| No. 6 | 500 | 1.5 | 1 | 2.5 | 2 | + |
| | 250 | 1 | 0 | 1.5 | 1 | — |
| | 125 | 0 | 0 | 0 | 0 | — |
| No. 7 | 500 | 3 | 3 | 3 | 2.5 | +~++ |
| | 250 | 2 | 2 | 2 | 2 | ± |
| | 125 | 1 | 1 | 1 | 0 | — |

Table 3-continued

| Active ingredient | Dose (g/10a) | Inhibition rate | | | | Phytotoxicity on paddy rice plant |
|---|---|---|---|---|---|---|
| | | Barnyardgrass | Konagi | Slenderspikerush | Mizugayaturi | |
| No. 8 | 500 | 2 | 1 | 2.5 | 2 | + |
| | 250 | 1 | 0 | 1.5 | 1 | − |
| | 125 | 0 | 0 | 1 | 0 | − |
| No. 9 | 500 | 1 | 1 | 1.5 | 1 | − |
| | 250 | 0 | 0 | 1 | 0 | − |
| | 125 | 0 | 0 | 0 | 0 | − |
| British Patent 995,497 | | | | | | |
| No. 10 | 500 | 3.5 | 3 | 3 | 3 | ++ |
| | 250 | 2.5 | 2 | 2 | 2 | + |
| | 125 | 1.5 | 1 | 1 | 1 | − |
| No. 11 | 500 | 3.5 | 3 | 3.5 | 4 | ++ |
| | 250 | 2.5 | 2 | 2.5 | 3 | + |
| | 125 | 1 | 1 | 1 | 2 | − |
| No. 12 | 500 | 3 | 2.5 | 3.5 | 3 | ++ |
| | 250 | 2 | 1.5 | 2.5 | 2 | ± |
| | 125 | 1 | 0 | 1.5 | 0 | − |
| No. 13 | 500 | 1 | 1 | 1.5 | 1 | ± |
| | 250 | 0 | 0 | 0 | 0 | − |
| | 125 | 0 | 0 | 0 | 0 | − |
| No. 14 | 500 | 4 | 3 | 4 | 3.5 | ++~+++ |
| | 250 | 3 | 2 | 3 | 2.5 | +~++ |
| | 125 | 2 | 1 | 2 | 1 | ± |
| No. 15 | 500 | 3 | 2 | 3.5 | 3 | +~++ |
| | 250 | 2 | 1 | 2 | 2 | ± |
| | 125 | 1 | 0 | 1 | 1 | − |
| Blank sample* | − | 0 | 0 | 0 | 0 | − |
| Untreated | − | 0 | 0 | 0 | 0 | − |

Note:* In the above described preparation of the wettable powder, the active ingredint was removed, that is, this composition consists of white carbon, diatomaceous earth and wetting agent.

In the above Table 3, Nos. of the active ingredients correspond to Nos. of the active ingredients in Table 2, respectively.

Inhibition rate:
5 : complete control
0 : no effect

Phytotoxicity:
+++ : severe damage
− : no damage

EXPERIMENTAL EXAMPLE 4

Test for controlling weeds in lawn and for phytotoxicity on turf:

Test method

Upland soil was fed in plastic vessels having a surface area of 250 cm$^2$, and seeds of Mana-grass, Annual Poa, Smartweed, Wild amaranth and Asiatic dayflower were sowed on the vessels respectively. Immediately, a test solution obtained by diluting a given amount of the emulsiable concentrate described in Example 3 with water was sprayed on the soil surface at a rate of 150 $l$/10 a.

Further, in order to test the phytotoxicity of S-(2-chlorobenzyl)-N,N-di-isopropylthiocarbamate on turf, the same test solution as used in the above treatment of the weeds was sprayed on Japanese lawngrass, Manilagrass and Bermudagrass, which had been planted in the same vessels as described above one year ago and grown up.

For comparison, the above harbicidal activity test and phytotoxicity test were effected by using a test solution containing S-(4-chlorobenzyl)-N,N-di-isopropylthiocarbamate or TCTP instead of the S-(2-chlorobenzyl)-N,N-di-isopropylthiocarbamate of the present invention.

One month after the treatment, the inhibition rate against the weeds and the phytotoxicity on the turfs were determined to obtain a result as shown in the following Table 4.

1. A method of selectively killing undesirable weeds in lawn by spreading thereon a herbicidally effective amount of S-(2-chlorobenzyl)-N,N-di-isopropylthiocarbamate, in combination with an inert diluent.

Table 4

| Active ingredient | Dose (g/10a) | Inhibition rate Weed | | | | | Phytotoxicity Turf | | |
|---|---|---|---|---|---|---|---|---|---|
| | | Mana-grass | Annual Poa | Smart-weed | Wild amaranth | Asiatic day-flower | Japanese lawn grass | Manila-grass | Bermuda-grass |
| 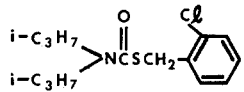 (Present Invention) | 100 | 5 | 4 | 3 | 3 | 3 | — | — | — |
| | 200 | 5 | 5 | 5 | 4 | 5 | — | — | — |
| | 400 | 5 | 5 | 5 | 5 | 5 | — | — | — |
| | 800 | 5 | 5 | 5 | 5 | 5 | — | — | — |
| | 1,600 | 5 | 5 | 5 | 5 | 5 | — | — | — |
| 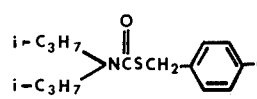 (Comparative compound) | 100 | 3 | 2 | 0 | 0 | 0 | — | — | + |
| | 200 | 4 | 4 | 2 | 1 | 2 | — | + | + |
| | 400 | 5 | 4 | 3 | 2 | 3 | + | ++ | ++ |
| | 800 | 5 | 5 | 4 | 3 | 4 | ++ | ++ | ++ |
| | 1,600 | 5 | 5 | 5 | 4 | 5 | ++ | ++ | ++ |
| 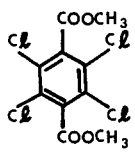 (Comparative compound) | 100 | 2 | 2 | 1 | 2 | 0 | — | — | — |
| | 200 | 4 | 3 | 1 | 3 | 0 | — | — | — |
| | 400 | 5 | 4 | 2 | 3 | 1 | — | — | — |
| | 800 | 5 | 5 | 2 | 4 | 2 | + | + | + |
| | 1,600 | 5 | 5 | 3 | 4 | 2 | + | ++ | + |

Note:
Inhibition rate:
5—complete control
0—no effect
Phytotoxicity:
+++—severe damage
++—moderate damage
+—slight damage
——no damage

What is claimed is:

* * * * *